United States Patent
Wong et al.

(10) Patent No.: US 8,522,299 B2
(45) Date of Patent: Aug. 27, 2013

(54) VIRTUAL PERSONAL VIDEO RECORDER

(75) Inventors: Curtis G. Wong, Medina, WA (US);
Dale A. Sather, Seattle, WA (US);
Kenneth Reneris, Clyde Hill, WA (US);
Thaddeus C. Pritchett, Edmonds, WA (US); Behrooz Chitsaz, Bellevue, WA (US); Talal Ali Batrouny, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 975 days.

(21) Appl. No.: 11/764,043

(22) Filed: Jun. 15, 2007

(65) Prior Publication Data
US 2008/0313402 A1 Dec. 18, 2008

(51) Int. Cl.
*H04N 7/173* (2011.01)
(52) U.S. Cl.
USPC .............. 725/134; 725/80; 725/141; 725/153
(58) Field of Classification Search
USPC .................... 725/80, 133, 141, 153, 134, 142
See application file for complete search history.

(56) References Cited

U.S. PATENT DOCUMENTS

| | | | |
|---|---|---|---|
| 6,678,462 B1 * | 1/2004 | Chihara | 386/83 |
| 6,868,292 B2 * | 3/2005 | Ficco et al. | 700/19 |
| 7,461,393 B1 * | 12/2008 | Kishitaka et al. | 725/131 |
| 2002/0088002 A1 * | 7/2002 | Shintani et al. | 725/110 |
| 2002/0194609 A1 * | 12/2002 | Tran | 725/95 |
| 2003/0192054 A1 * | 10/2003 | Birks et al. | 725/100 |
| 2004/0205816 A1 * | 10/2004 | Barrett | 725/49 |
| 2005/0050578 A1 * | 3/2005 | Ryal | 725/143 |
| 2005/0177848 A1 * | 8/2005 | Hyun | 725/44 |
| 2005/0193414 A1 * | 9/2005 | Horvitz et al. | 725/46 |
| 2005/0198689 A1 * | 9/2005 | Marsh | 725/135 |
| 2006/0107289 A1 * | 5/2006 | DeYonker et al. | 725/37 |
| 2006/0184975 A1 * | 8/2006 | Casey | 725/81 |
| 2008/0046599 A1 * | 2/2008 | Hutson et al. | 710/1 |

* cited by examiner

*Primary Examiner* — Farzana Hossain
(74) *Attorney, Agent, or Firm* — Lee & Hayes, PLLC (57) ABSTRACT

The claimed subject matter provides a system and/or method that manages media content. The disclosed system includes a component that synchronizes with a multimedia player that is in communication with the component. The component upon synchronization automatically determines an amount of storage space available on the handheld device and based at least in part on this available space, the component substitutes a first media presentation persisted on the storage space with a second media presentation retrieved from a media storage farm.

18 Claims, 8 Drawing Sheets

VIRTUAL PERSONAL VIDEO RECORDER

BACKGROUND

Users of conventional television and cable systems often employ recording systems to implement noncommercial time shifting functions of desired programs. In this way, an individual is able to record a program that the individual is unable to view as it is being broadcast and watch the recorded program in a more convenient time.

One type of recording system employs a feature that enables a user to record a pre-selected program by entering a unique program identification number associated with specific program. The program identification number, which may be found in a printed television listing, corresponds to programming information (e.g., channel, time, duration) that is employed by the recording system to record the particular program when it is broadcast.

In order to remain competitive in the home entertainment industry, manufacturers and service providers have been increasing their efforts to develop improved entertainment systems. A rapidly evolving type of entertainment system relates to personal video recorder (PVR) system. A personal video recorder (PVR) system includes a large digital data storage device, such as a hard disk, for storing recorded audio and/or video programming in digital format (e.g., without a videotape). The storage device enables a viewer to effectively and efficiently implement a time-shifting function so that the viewer can watch the recorded program at a more convenient time. The personal video recorder (PVR) system receives broadcast programs from a service provider, such as in the form of cable television, satellite, or another source of programming. The personal video recorder (PVR) system may also employ a video compression system (e.g., an MPEG-2 format) in combination with an analog to digital converter for converting analog broadcast signals into an appropriate digital format. Alternatively or additionally, the personal video recorder (PVR) system can receive broadcast signals in a digital format.

A personal video recorder (PVR) system further may provide enhanced recording capabilities and enhanced television functionality. By way of example, the personal video recorder (PVR) system may include a virtual pausing functionality, such that a user may pause a live broadcast for a period of time while the personal video recorder (PVR) system continues to record the live broadcast. The user may then continue watching from the point that the pause was initiated while the personal video recorder (PVR) system continues to record the live broadcast. Other available features can include fast forwarding through recorded programming, rewinding parts of recorded programming, skipping ahead through the recorded programming, as well as of the enhanced television functionality.

Another feature of the personal video recorder (PVR) system relates to intelligent recording of programming. One example of intelligent recording enables the user to program one or more keywords that are searched for utilizing an electronic program guide stored on the personal video recorder (PVR) system. The personal video recorder (PVR), in turn, automatically records shows that match the search criteria. Another recording method enables a user to select particular program to record all future broadcast episodes of that program.

Consequently, as the available bandwidth for broadcast programs continues to increase, service providers are continuing to increase the number of programming channels from which to choose. Additionally, with the advent of high definition broadcasting modalities and the commensurate increase in the amount storage space necessary to persist such broadcast programs, current storage media associated with standard personal video recorders (PVRs), and more particularly, hand-held devices with multimedia playback and record capabilities is not satisfactory.

SUMMARY

The following presents a simplified summary in order to provide a basic understanding of some aspects of the disclosed subject matter. This summary is not an extensive overview, and it is not intended to identify key/critical elements or to delineate the scope thereof Its sole purpose is to present some concepts in a simplified form as a prelude to the more detailed description that is presented later.

Storage on handheld devices is limited, and there is an ever increasing demand to store content of large-size (e.g., movies, multimedia presentations, audio files, etc.) on such handheld devices. The demand for storage space on such devices far outpaces available space often forcing users to repeatedly delete certain content in order to make room for new content. The subject matter as claimed in one aspect leverages remote storage facilities to effectively increased storage capacity of a handheld device. The handheld device can be synchronized with a service (e.g., web-based service) that monitors and manages available space on the handheld device. The service can age out content likely to not be watched in the near future while still retaining a marker for such content on the handheld device. Thus, if the user desires to watch aged out content, the service can automatically download previously deleted content back to the handheld device. Additionally, the service works in the background, employing sophisticated aging policies to know when and which content should be scaled down (e.g., compressed). When an item is scaled down, the service does not compel the handheld device to completely discard the content; rather, the service causes the handheld device to maintain a tag, link, flag, or cache to the item of interest. The size of the cache can, for example, be dynamically and variably dependent on Internet connection speeds. If and when the user elects to play a previously aged out and/or compressed (e.g., scaled-down) multimedia clip on the handheld device, the service can designate other content persisted on storage media associated with handheld device to be compressed and/or aged out, initiates the download of the full requested content, and begins immediate playback, leveraging the cached portion to provide an uninterrupted viewing experience. The user can simply sit back and enjoy the extra movies, and never needs to be bothered with managing the storage space associated with the handheld device.

In a further aspect the subject matter can provide for hot swapping large sets of files. For example, the claimed subject matter can move all video content persisted on the handheld device to a remote storage media, transfer selected audio content stored on the remote storage media to the handheld device, and subsequently, after a significant hiatus, reload all the video content previously transferred to the remote storage media back to the handheld device while still maintaining the ordering (e.g., full, aged, and/or compressed media clips) of all video content that were previously stored on the handheld device (e.g., before the initial transfer of the video content).

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is

DETAILED DESCRIPTION

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

It should be noted at the outset that the claimed subject matter has been elucidated as managing media content associated with one particular classification or type of device. Nevertheless, as will be recognized by those cognizant in the art the subject matter is not so limited and can find pertinent application in a plethora of other contexts, mechanisms, and applications beyond the paradigm set forth herein without necessarily departing from the spirit, intent and scope the subject matter as claimed. Accordingly, any and all such applicability, and derivations thereof, is deemed to fall within the ambit of the claimed subject matter.

Figure 1:
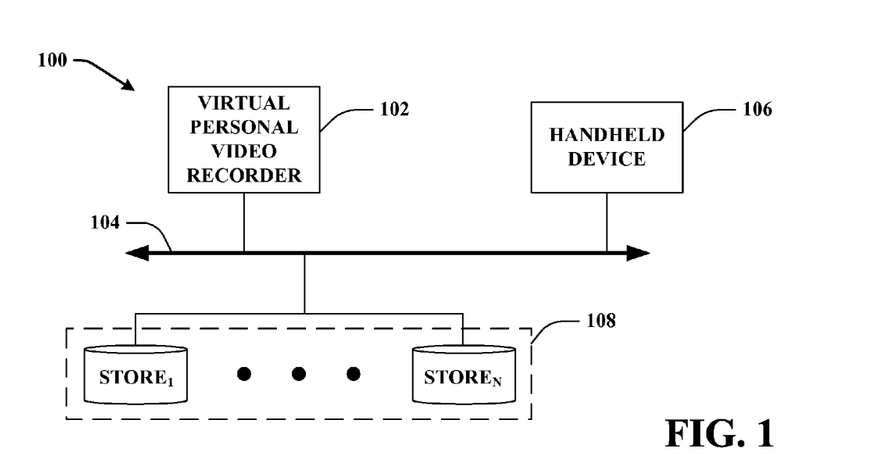
FIG. 1 illustrates a machine-implemented system that manages media content associated with handheld devices in accordance with the claimed subject matter.

FIG. 1 illustrates a system 100 that manages media content associated with handheld devices (e.g. Personal Digital Assistants (PDAs), cell phones, mobile phones, smart phones, multimedia and Internet enabled mobile phones, notebook computers, Tablet PCs, laptop computers, portable media devices capable of storing and/or playing files in one or more media format, etc.). System 100 can include virtual personal video recorder 102 that leverages storage facilities associated with a remote storage media farm to commensurately increase storage capacity of a handheld device. System 100 can also include a remote storage media farm 108 that can comprise a disparate multitude of storage media (e.g., volatile and/or nonvolatile memory that can be electronically erased and/or programmed, nonvolatile storage that persists digitally encoded data on rapidly rotating platters with magnetic and/or optically retentive surfaces and/or coatings, and/or magnetic tape). As illustrated, remote storage media farm 108 can include a first storage media, store$_1$, through an Nth storage media, store$_N$, N being an integer greater than or equal to one, to store multimedia content. As illustrated, first storage media, store, through to the Nth storage media, store$_N$, has collectively been denoted as remote storage media farm 108. Illustrative storage media that can be aggregated together to form remote storage media farm 108 can include nonvolatile memory typically employed in memory cards, thumb devices, handy drives, memory sticks, and the like. Further, remote storage media from 108 can also utilize physical memory media associated with other common consumer and/or household devices, such as desktop computers (e.g., personal computers manufactured specifically for use on a desk in an office or home and distinguishable from portable computers such as laptops), hand-held devices (e.g., Personal Digital Assistants (PDAs), cell phones or mobile phones, smart phones, multimedia and Internet enabled mobile phones, etc.), portable computers (e.g., notebook computers, Tablet PCs, laptop computers, and the like), Personal Video Recorder (PVRs) and/or Digital Video Recorders (DVRs) (e.g., any device capable of recording audio/video multimedia presentations without videotape to digital storage media, and playback recorded content from digital storage media), multimedia players (e.g., portable media players capable of storing and/or playing files in one or more media format), and household devices (e.g., televisions, video recorders, camcorders, High Fidelity home cinema centers, video game controllers, digital audio players, consumer electronics, such as, compact disk players, digital versatile disk players, and home appliances, such as, dishwashers, washing machines, microwave ovens, convection and conventional ovens, clothes dryers, and the like).

As illustrated, virtual personal video recorder 102 can be any type of machine, or can reside and/or execute on any type of machine that includes a processor. Illustrative machines that can constitute virtual personal video recorder 102 can include Personal Digital Assistants (PDAs), cell phones, smart phones, laptop computers, notebook computers, consumer devices/appliances, industrial automation devices, hand-held devices, desktop computers, server class computing devices, etc. Virtual personal video recorder 102, as depicted, can be in continuous and operative, or sporadic but intermittent communication via network topology 104 with handheld device 106 and/or remote storage media farm 108.

Network topology 104 can include any viable communication and/or broadcast technology, for example, wide and/or wireless modalities and/or technologies can be utilized to effectuate the subject matter as claimed. Moreover, network topology 104 can include utilization of Personal Area Networks (PANs), Local Area Networks (LANs), Campus Area Networks (CAMs), Metropolitan Area Networks (MANs), extranets, intranets, the Internet, Wide Area Networks (WANs)—both centralized and distributed—and/or any combination, permutation, and/or aggregation thereof Additionally and/or alternatively, network topology 104 can employ powerline communications wherein power distribution wires are utilized for both the simultaneous distribution of data as well as transmission of power.

Handheld device 106, similar to virtual personal video recorder 102, can include any device that includes a processor and that is capable of effective communications with network topology 104. As indicated above, hand-held device 106 can include Personal Digital Assistants (PDAs), cell phones, mobile phones, smart phones, multimedia and Internet enabled mobile phones, notebook computers, Tablet PCs, laptop computers, portable media devices capable of storing and/or playing files in one or more media format, etc. Handheld device 106 in addition can be in continuous and/or sporadic communication via network topology 104 with virtual personal video recorder 102, during which time handheld device 106 can effectuate and facilitate synchronization with virtual personal video recorder 102.

As stated above, virtual personal video recorder 102 can be in continuous and operative, and/or sporadic and intermittent communication with both remote storage media farm 108 and/or handheld device 106. Virtual personal video recorder 102 monitors and/or manages available space associated with handheld device 106 and/or remote storage media farm 108. During the course of monitoring and managing space associated with handheld device 106 and/or remote storage media farm 108, virtual personal video recorder 102 can periodically and automatically age out multimedia content persisted on storage media affiliated with handheld device 106, wherein aged out content is determined by the likelihood that the content will not need to be played back for the user in the near future. Further, virtual personal video recorder 102 when aging out content persisted on storage media associated with handheld device 106 can effectively compress such content. In other words, virtual personal video recorder 102 can remove and transfer all but the initial few frames of a multimedia clip from storage media associated with handheld device 106 to remote storage farm 108 so as to ensure that when a user of the handheld device subsequently requests that previously aged out and/or compressed content be played back on the handheld device the multimedia clip in its entirety will be presented in an uninterrupted manner such that the user does not perceive the fact that requested content had been aged out, compressed, and/or persisted on a remote storage media farm 108. Accordingly, emotional personal video recorder 102 in order to effectuate this aging a process can utilize sophisticated aging policies, for example, through use of artificial intelligence and/or machine learning modalities, to ascertain when and/or which content to selectively age or compress.

Figure 2:
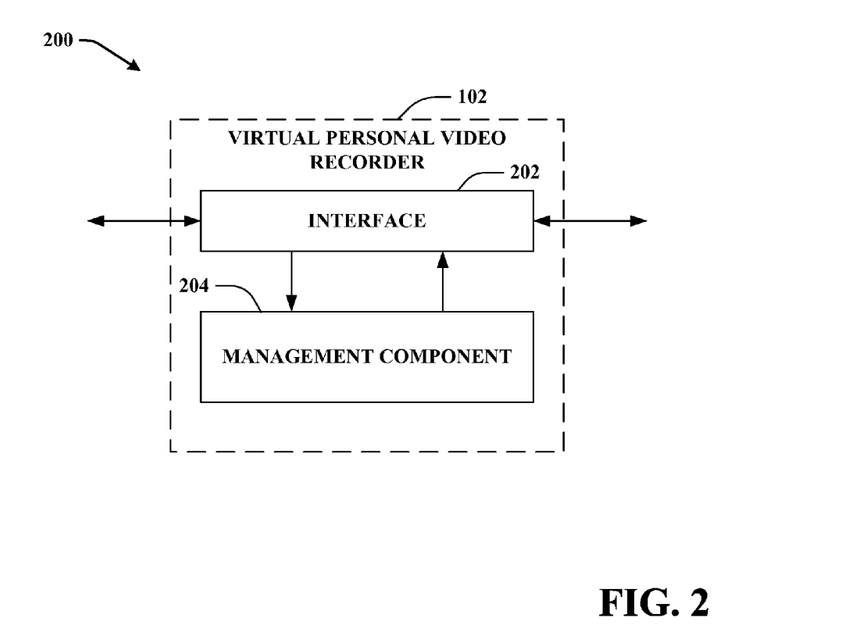
FIG. 2 provides a more detailed depiction of a virtual personal video recorder in accordance with one aspect of the claimed subject matter.

FIG. 2 provides a more detailed depiction 200 of virtual personal video recorder 102. As illustrated, virtual personal video recorder 102 can include interface component 202 (hereinafter referred to as "interface 202") that can be in continuous and/or intermittent communication with handheld device 106 and remote storage media farm 108 via network topology 104. Additionally, virtual personal video recorder 102 can also include management component 204 that effectuates and facilitates managing and monitoring storage media affiliated with handheld device 106 and the plurality of storage media associated with remote storage farm 108.

Interface 202 can receive data from a multitude of sources, such as, for example, data associated with a particular multimedia presentation, client application, service, user, client, device, and/or entity involved with a particular transaction, a portion of transaction, and thereafter convey the received information to management component 204 for subsequent analysis. Additionally, interface 202 can receive information from management component 204 regarding the management of storage media affiliated with handheld device 106 and/or the multitude of storage media that can comprise remote storage farm 108.

Interface 202 can provide various adapters, connectors, channels, communication pathways, etc. to integrate the various components included in system 200 into virtually any operating system and/or database system and/or with one another. Additionally, interface 202 can provide various adapters, connectors, channels, communication modalities, etc. that provide for interaction with various components that can comprise system 200, and/or any other component (external and/or internal), data, and the like associated with system 200.

Management component 204 manages and/or monitors available space associated with handheld device 106 as well as remote storage media farm 108. Management component 204 can periodically and automatically synchronize with handheld device 106 to ascertain whether multimedia presentations (e.g., movies, audio clips, multimedia fragments, and the like) need to be aged out from associated storage media. Management component 204 can determine whether or not multimedia presentations should be aged off associated storage media by resorting to one or more aging policies that can utilize heuristics, artificial intelligence, machine learning, statistical or probabilistic devices and/or methodologies to ascertain the future probability and/or likelihood, based at least on part on a particular user's prior utilization of handheld device 106 and/or potential interest in a particular multimedia presentation, that content should be archived and/or removed from the associated storage media.

When aging and/or archiving content from associated storage media to remote storage media farm 108, based at least in part on a determined lack of interest on the part of a user of handheld device 106, management component 204 can compress content resident on handheld device 106. For example, when management component 204 can compress content resident on handheld device 106 by removing content from storage media associated with handheld device 106, management component 204 can thereafter persist a marker (e.g., a link, a flag, a cache containing the first few frames from the multimedia presentation identified to be archived or aged, and the like) so that when a user of the handheld device 106 subsequently requests that previously locally stored, but now archived, compressed, and/or remotely persisted, content be played back on the handheld device, such content will be played back in an uninterrupted manner such that the user will not perceive the fact that the requested content had been aged out, compressed, and/or persisted in remote storage media farm 108.

It should be noted that when management component 204 persists a marker, and/or more particularly, when management component 204 creates a cache containing the first few frames from a multimedia presentation identified to be archived or aged, the size of the cache created can be dependent on the Internet connection speed associated with network topology 104. Accordingly, the cache size is dynamically determined and can be variable depending on the environment in which handheld device 106 is operating. For instance, if handheld device 106 is operating in an environment where communication speed of network topology 106 is very slow (e.g., 300 Baud modem) management component 204 can dynamically and automatically affix the cache size to be commensurately larger than if handheld device 106 is placed in an environment where the communication speed of network topology 106 is exceedingly fast (e.g., gigabit Ethernet communications).

Management component 204 can also include a retrieval aspect wherein when a user elects to play aged, archived, or compressed and remotely persisted content, management component 204 can identify and designate other content currently persisted on storage media associated with handheld device 106 for possible compression, archival, and storage on remote storage media farm 108, downloads or retrieves requested content from remote storage media farm 108, and instigates handheld device 106 to start immediately playing back the requested content commencing with previously persisted frames (e.g., frames that had previously been persisted in a cache).

Management component 204 can further facilitate and effectuate hot swapping of large sets of files. For example, management component 204 can receive a request from a user to move all video content associated with handheld device 106 to remote storage media farm 108, load all music content (or selected tracks thereof) previously persisted in remote storage media farm 108 onto handheld device 106, and after a short but substantial hiatus, during which time the user can play back the music content stored on handheld device 106, swap out all the music content now persisted on the handheld device 106 to remote storage media farm 108 for all the video content previously persisted on remote storage media farm 108. The foregoing can be accomplished while maintaining any pre-established caching, ordering, compression, and/or aging policies that were in existence prior to the initial movement of all the video content associated with handheld device 106.

Additionally, management component 204 can also include the recording aspect wherein the management component 204 can selectively record broadcast media clips in high-definition or standard definition. The determination as to whether or not to record media clips in high-definition standard definition can be dependent upon factors such as free space associated with handheld device 106, speed of the communication network 104, retrieval rates from remote storage media farm 108, for example.

Additional functionalities of management component 204 can include an ability to search or surf across live and recorded/cached content for selected items (e.g., multimedia fragments) of interest to the user. For instance, a user may wish to locate all multimedia clips related to Neolithic peoples in Sub-Saharan Africa, for example. Accordingly, management component 204 can identify, locate, and play these selected clips after searching storage media associated with handheld device 106 and remote storage media farm 108.

Figure 3:
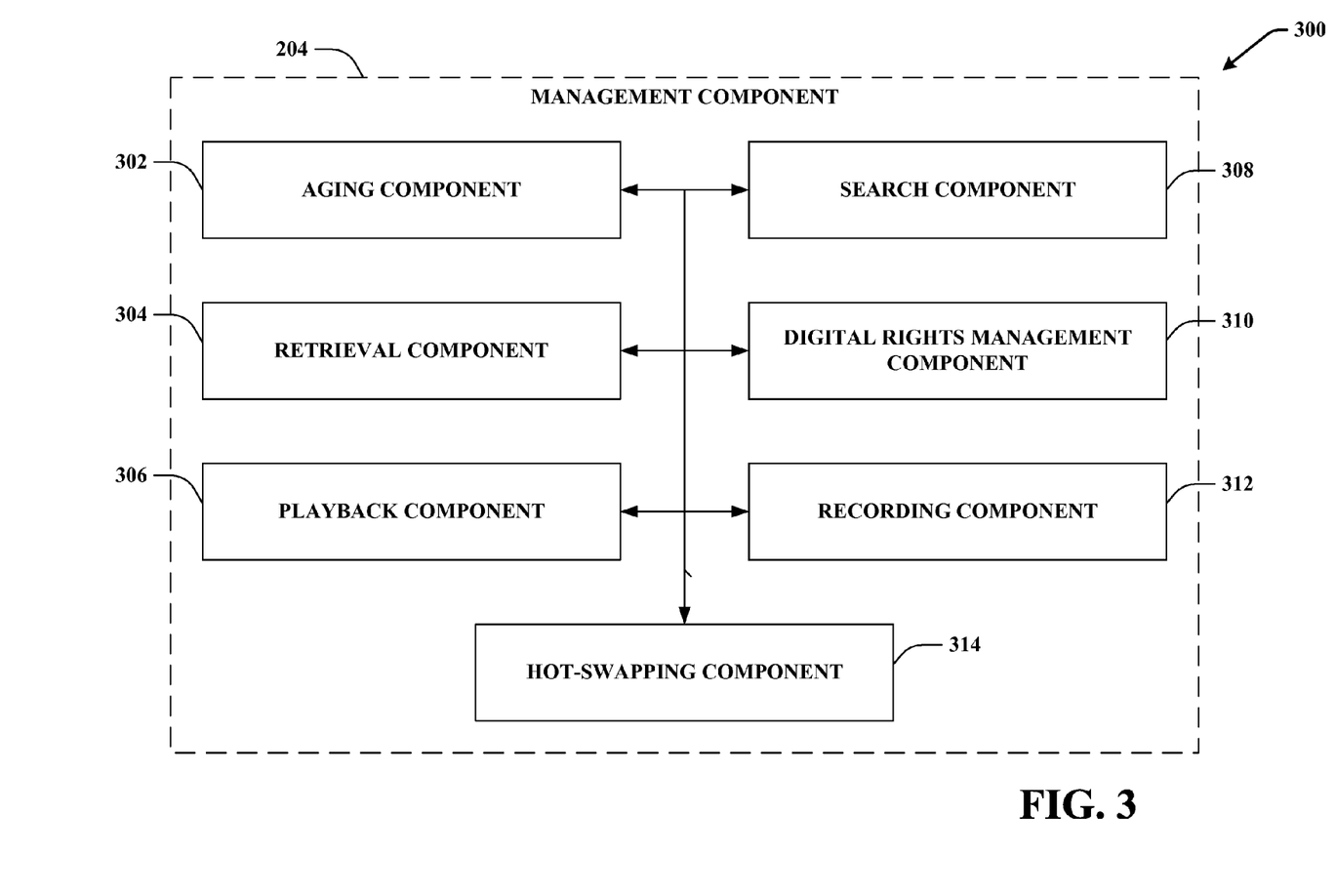
FIG. 3 provides a more detailed depiction of an illustrative management component that manages and/or monitors storage media associated with both a handheld device and a remote storage media farm in accordance with an aspect of the claimed subject matter.

FIG. 3 provide a more detailed illustration 300 of management component 204 that manages and/or monitors storage media associated with both handheld device 106 as well as remote storage media farm 108. As illustrated, management component 204 can include aging component 302, retrieval component 304, playback component 306, search component 308, digital rights management component 310, recording component 312, and hot-swapping component 314.

Aging component 302 can periodically and/or continuously monitor storage media associated with handheld device 106 to determine whether or not multimedia presentations stored thereon need to be aged out. Aging component 302 can determine whether or not multimedia presentation should be aged off associated storage media by utilizing one or more aging policies. Such aging policies can utilize artificial intelligence, machine learning, statistical and/or probabilistic methodologies, heuristics, and the like to ascertain the future probability and/or likelihood that identify content should be archived, aged out, and/or removed from storage media associated with handheld device 106. Additionally, the aging policies can be based at least in part on a particular user's prior utilization of handheld device 106 and/or potential interest in a particular multimedia presentation.

Further, aging component 302 when aging, archiving, and/or transferring content from associated storage media to remote storage media farm 108, prior to removal all frames, can compress content resident on handheld device 106. For instance, aging component 302 can compress content resident on handheld device 106 by deleting all but the first few frames of the multimedia presentation which can be persisted in a cache that remains on storage media associated with handheld device 106. This small cache containing the first few frames of the multimedia presentation can be utilized to provide uninterrupted viewing of aged out, removed, and compressed content when a user elicits a request to view the content at some future date.

Management component 204 and further include retrieval component 304 that can be deployed where a user elects to play previously aged out, archived, and/or compressed and remotely persisted content. Retrieval component 304, when a user elicits a desire to play such content, can identify and designate other content currently persisted on storage media associated with handheld device 106 for subsequent and possible compression, archival, and remote storage on storage media farm 108. Retrieval component 304 can further effectuate download of requested content from remote storage media farm 108

Additionally, management component 204 can also include a playback component 306 that based on a user request to play currently extant and stored content, previously aged out, archived, and/or compressed and remotely persisted content, and/or content that is currently being broadcast, can cause handheld device 106 to start immediate playback of the requested of content. Where a user requests playback of previously aged out, archived, and/or compressed and remotely persisted content, playback component 306 can utilize stored tags, flags, links, etc. to commence playback with the first few frames that had previously been cached and persisted on storage media associated with handheld device 106.

Management component 204 can further include search component 308 that provide users the ability to search extant and stored content, previously aged out, archived, and/or compressed and remotely persisted content, and/or content that is currently being broadcast (e.g., live content) for items of interest to the user. For example, the search component 308 can utilize various metadata (e.g., closed captioning information) associated with the various multimedia clips to facilitate the search. Where items of interest are identified search component 308 can provide indication to playback component 306 to instigate handheld device 106 to start immediate playback of the identified of content.

Moreover, management component 204 can also include digital rights management component 310. Digital rights management component 310 can enforce and control access to digital data (e.g. multimedia clips, movies, music files, etc.). Such control can be effectuated through use of smart card, chip card, or integrated circuit technologies were in the smart card, chip card, integrated circuit technologies are utilized in conjunction and association with digital rights management component 310 to a permit or deny access to extant and stored content, previously aged out, archived, and/or compressed and remotely persisted content, and/or content that is currently being broadcast (e.g., live content).

Additionally, management component 204 can also include recording component 312 wherein when broadcast media presentations are recorded to storage media associated with handheld device 106, recording component can indicate whether or not the broadcast media presentation should be stored in a high definition format, a standard definition formation, or a low definition format. The determination as to whether or not presentations are stored in high definition, standard definition, or low definition format can be dependent on factors such as free space available on storage media associated with handheld device 106, retrieval and storage rates associated with remote storage media farm 108, and/or communication speeds associated with network topology 104.

Furthermore, management component 204 can also include hot swapping component 314 and facilitates and effectuates hot swapping of large sets of multimedia files. For instance, hot swapping component 314 can receive requests from users to transfer all video content associated with a particular handheld device 106 to a remote storage media farm 108 and load all music content stored on remote storage media 108 onto handheld device 106. Thereafter, once the user has tired of listening to the music transferred to handheld device 106, for example, users can indicate via hot swapping component 314 their desire to substitute the currently persisted music content for the previously transfer video content. Hot swapping component 314 in encompassing this facility can maintain any pre-established caching, ordering, compression, and/or aging policies that were in existence prior to the initial movement of the video content associated with handheld device 106.

Figure 4:
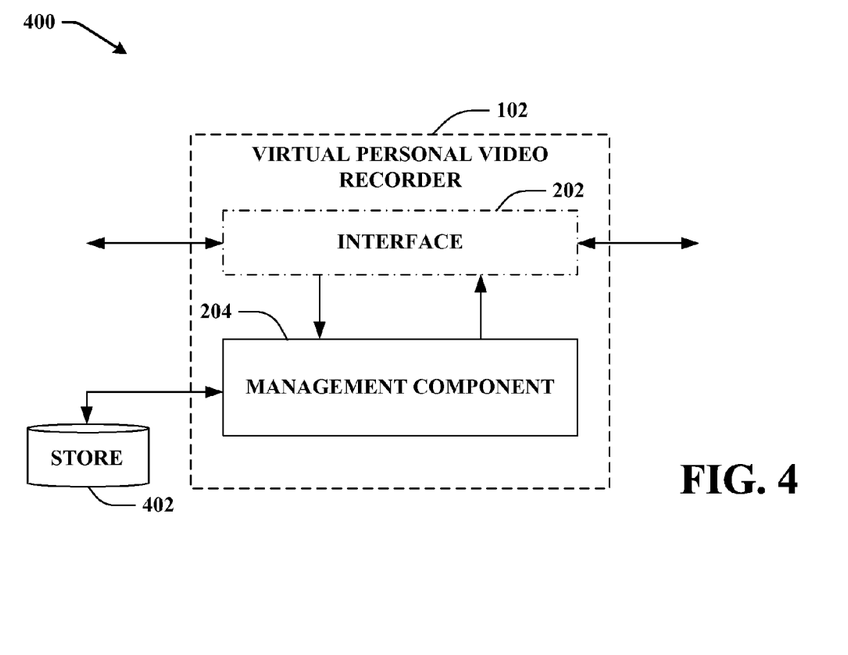
FIG. 4 illustrates a system implemented on a machine that manages media content associated with handheld devices in accordance with an aspect of the claimed subject matter.

FIG. 4 depicts an aspect of a system 400 that effectuates and facilitates management of media content. System 400 can include virtual personal video recorder 102 that can comprise interface 202 and management component 204. Additionally, system 400 can include store 402 that can include any suitable data necessary for management component 204 to monitor and/or manage multimedia content associated with handheld device 106. For instance, store 402 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 402 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 402 of the subject systems and methods is intended to comprise, without being limited to, these and any other suitable types of memory. In addition, it is to be appreciated that store 402 can be a server, a database, a hard drive, and the like.

Figure 5:
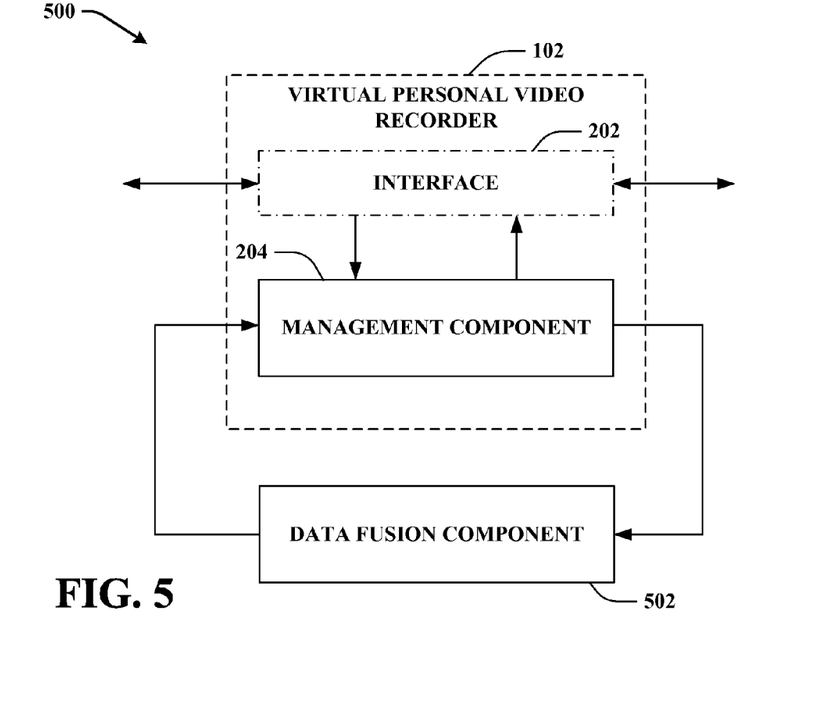
FIG. 5 provides a further depiction of a machine implemented system that manages media content associated with handheld devices in accordance with an aspect of the subject matter as claimed.

FIG. 5 provides yet a further depiction of a system 500 that effectuates and facilitates management of multimedia content persisted on handheld devices in accordance with an aspect of the claimed subject matter. As depicted, system 500 can include a data fusion component 502 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 502 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 6:
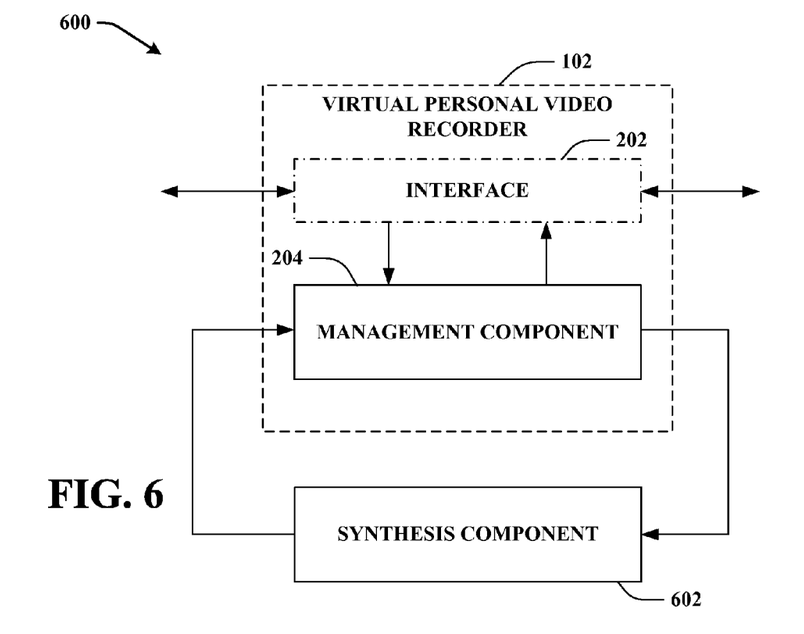
FIG. 6 illustrates yet another aspect of the machine implemented system that manages media content associated with handheld devices in accordance with an aspect of the claimed subject matter.

FIG. 6 provides a further depiction of a system 600 that effectuates and facilitates management of multimedia content stored on handheld devices in accordance with an aspect of the claimed subject matter. As illustrated management component 204 can, for example, employ synthesizing component 602 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 602 through combining and filtering can provide a set of information that can be more informative, or accurate (e.g., with respect to an entity's communicative or informational goals) and information from just one or two modalities, for example. As discussed in connection with FIG. 5, the data fusion component 502 can be employed to learn correlations between different data types, and the synthesizing component 602 can employ such correlations in connection with combining, or filtering the input data.

Figure 7:
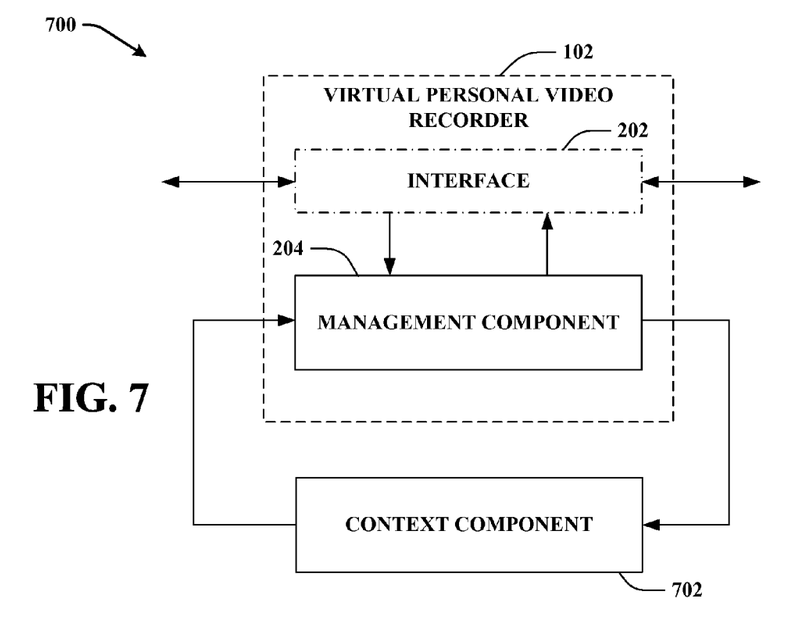
FIG. 7 depicts a further illustrative aspect of the machine implemented system that manages media content associated with handheld devices in accordance with an aspect of the claimed subject matter.

FIG. 7 provides a further illustration of a system 700 that can effectuate and facilitate monitoring and management of multimedia content persisted on handheld devices in accordance with an aspect of the claimed subject matter. As illustrated management component 204 can, for example, employ context component 702 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 702 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and, and stake). Knowledge that it is near dinnertime of the user as compared to the user campaign would greatly help in recognizing the following spoken words "I need a steak/stake". Thus, if the context component 702 had knowledge that the user was not camping, and that it was near dinnertime, the utterance would be interpreted as "steak". On the other hand, if the context component 702 knew (e.g., via GPS system input) that the user recently arrived at a camping ground within a national park; it might more heavily weight the utterance as "stake".

In view of the foregoing, it is readily apparent that utilization of the context component 702 to consider and analyze extrinsic information can substantially facilitate determining meaning of sets of inputs.

Figure 8:
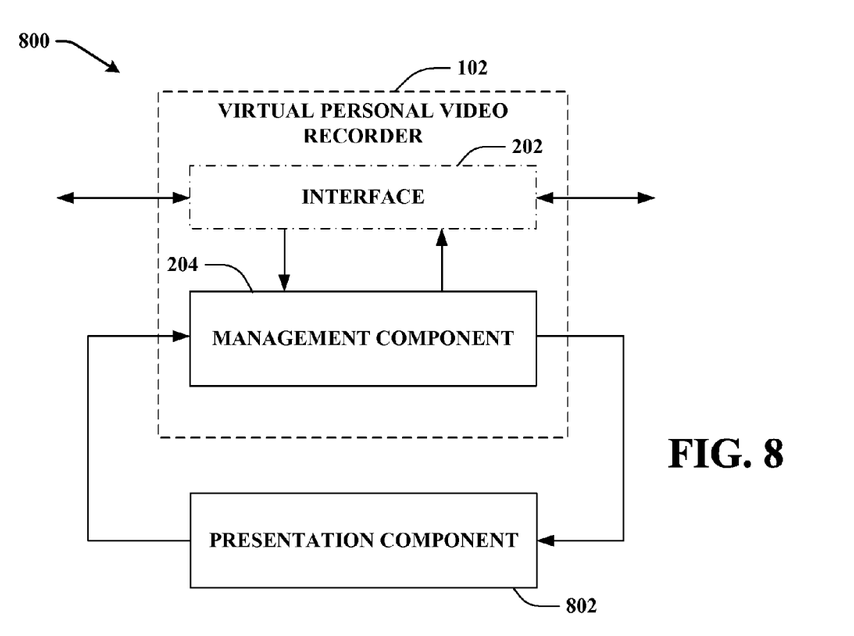
FIG. 8 illustrates another illustrative aspect of a system implemented on a machine that manages media content associated with handheld devices in accordance of yet another aspect of the claimed subject matter.

FIG. 8 a further illustration of a system 800 that effectuates and facilitates management of multimedia content persisted on handheld devices and/or remote storage media farms in accordance with an aspect of the claimed subject matter. As illustrated, system 800 can include presentation component 802 that can provide various types of user interface to facilitate interaction between a user and any component coupled to management component 204. As illustrated, presentation component 802 is a separate entity that can be utilized with management component 204. However, it is to be appreciated that presentation component 802 and/or other similar view components can be incorporated into management component 204 and/or a standalone unit. Presentation component 802 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into management component 204.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 9:
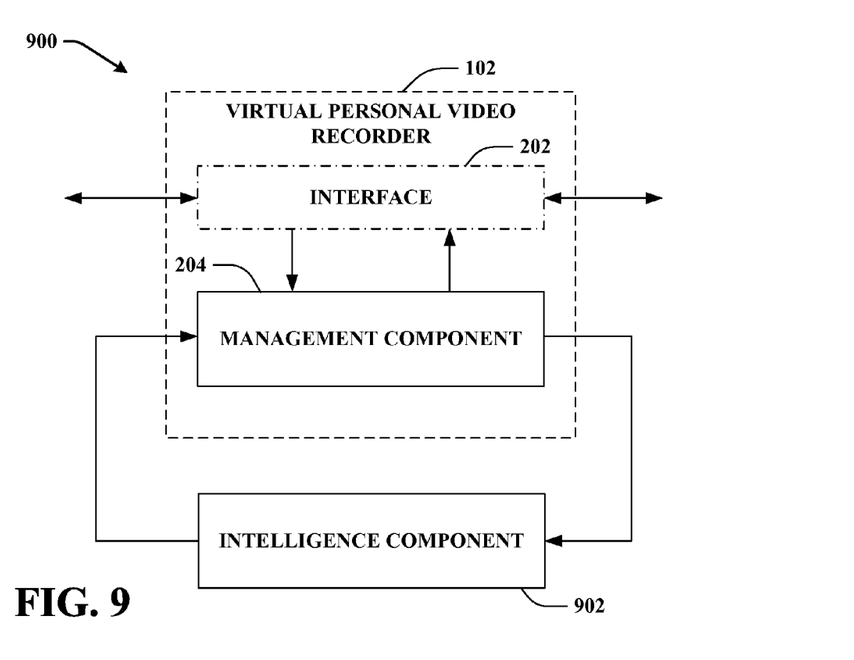
FIG. 9 depicts yet another illustrative aspect of a system that effectuates and facilitates encapsulation of metadata within watermarks that can be associated with multimedia segments or presentations in accordance with an aspect of the subject matter as claimed.

FIG. 9 depicts a system 900 that employs artificial intelligence to effectuate and facilitate monitoring and/or management of multimedia content persisted on storage facilities associated with handheld devices in accordance with an aspect of the subject matter as claimed. Accordingly, as illustrated, system 900 can include an intelligence component 902 that can be utilized, for example, to dynamically ascertain one or more of cache sizes, predictions as to a user's likes and dislike, prediction regarding a user's likelihood of watching particular multimedia content, and the like. Intelligence component 902 can employ a probabilistic based or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Intelligence component 902 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 902 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 10:
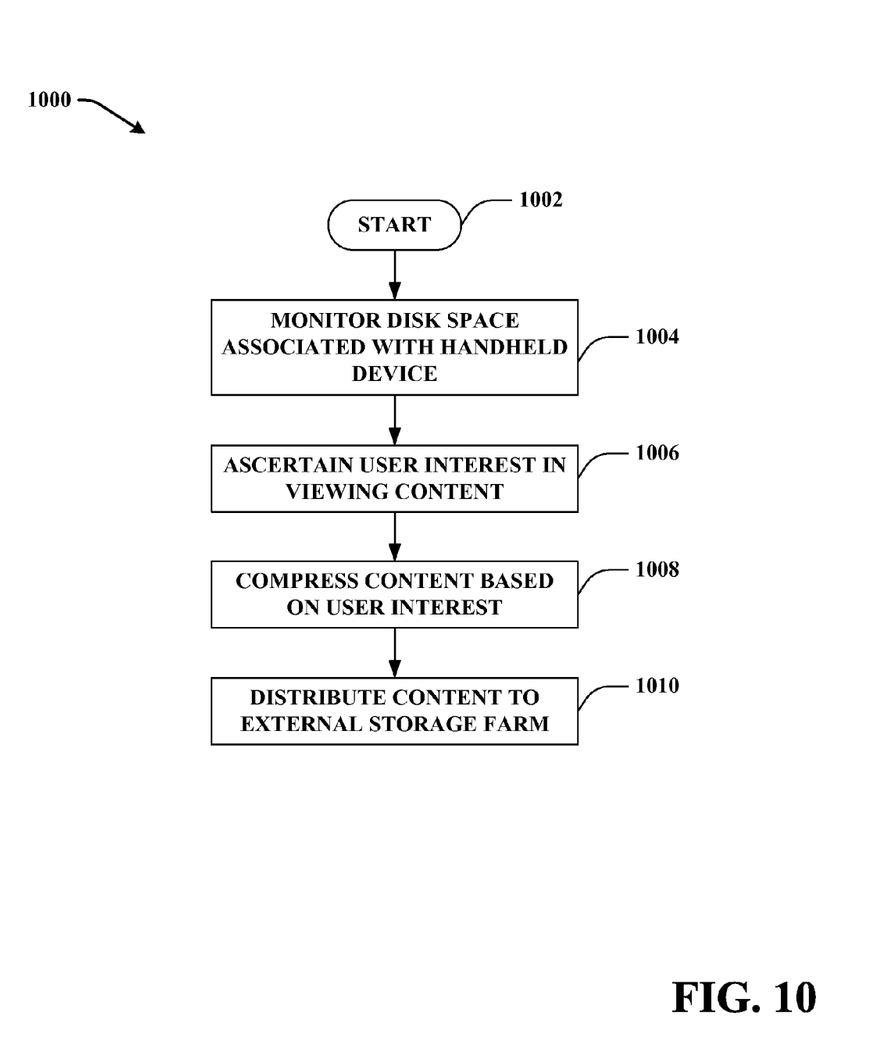
FIG. 10 illustrates a flow diagram of a machine implemented methodology that manages media content associated with handheld devices in accordance with an aspect of the claimed subject matter.

In view of the exemplary systems shown and described supra, methodologies that may be implemented in accordance with the disclosed subject matter will be better appreciated with reference to the flow chart of FIG. 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 10 depicts an illustrative methodology 1000 that can be implemented on a virtual personal video recorder system. At 1002 various and sundry initialization tasks and processes can be undertaken after which method 1000 can proceed to 1004. At 1004 methodology 1000 can monitor disk space associated with a handheld device. At 1006, methodology 1000 can employ one of heuristics, artificial intelligence, machine learning, statistical and/or probabilistic methodologies to ascertain the future probability and/or likelihood that particular content will stimulate a particular user's interest sufficient to provide indication of whether or not to maintain the content on storage media associated with handheld device, or transfer and remove the content and persist such content in a remote storage media farm for subsequent recall by the user at a more appropriate time. At 1008 and 1010 methodology 1000 can utilize the determinations made at 1006 to age out, archive, and/or compress content identified as being unlikely to be viewed by the user in the immediate future by distributing and persisting all but the initial frames of the multimedia content to one or more remote storage farms at 1010, and storing the initial frames in a cache resident on the handheld device at 1008.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 11:
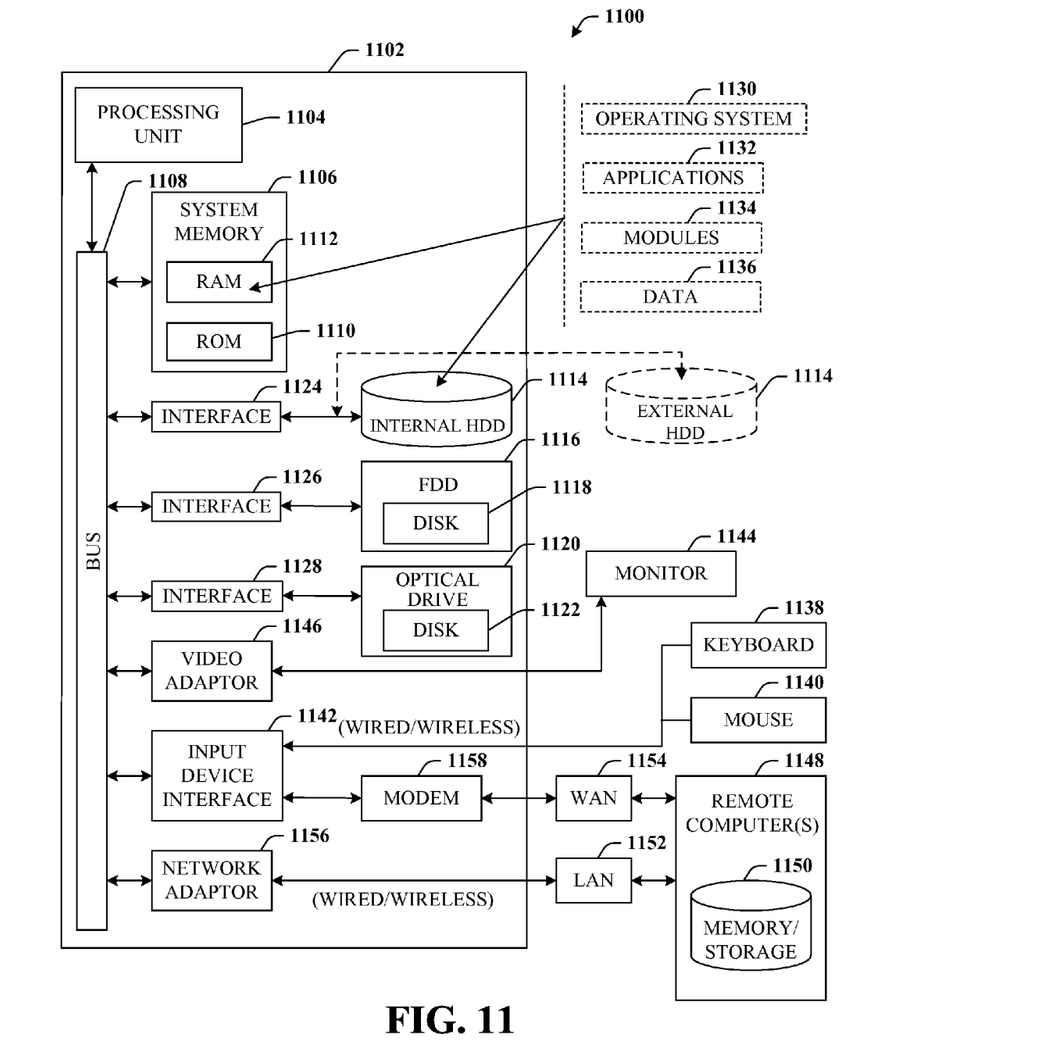
FIG. 11 illustrates a block diagram of a computer operable to execute the disclosed system in accordance with an aspect of the claimed subject matter.

Referring now to FIG. 11, there is illustrated a block diagram of a computer operable to execute the disclosed system. In order to provide additional context for various aspects thereof, FIG. 11 and the following discussion are intended to provide a brief, general description of a suitable computing environment 1100 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 11 14, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10 BaseT wired Ethernet networks used in many offices.

Figure 12:
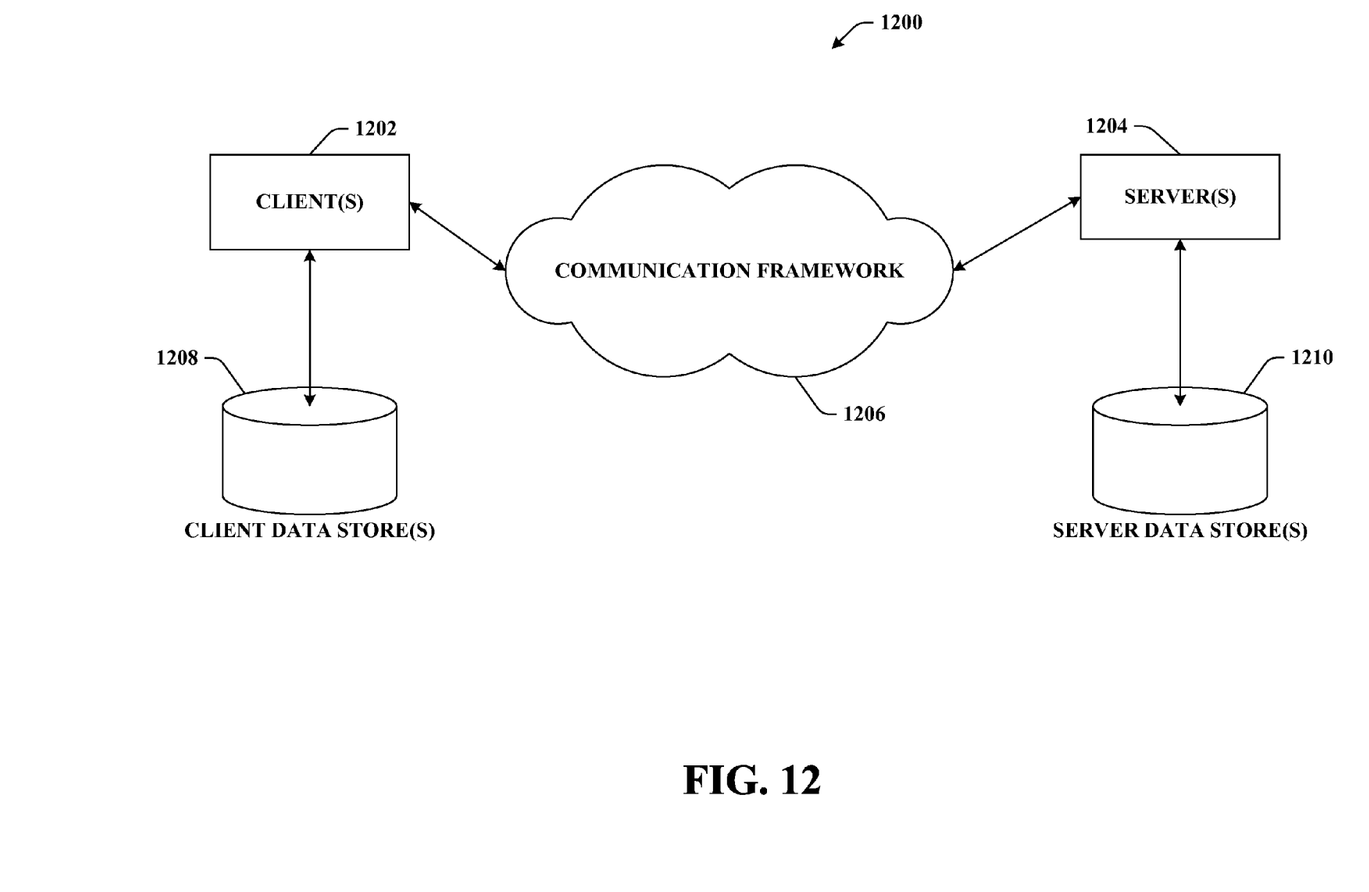
FIG. 12 illustrates a schematic block diagram of an exemplary computing environment for processing the disclosed architecture in accordance with another aspect.

Referring now to FIG. 12, there is illustrated a schematic block diagram of an exemplary computing environment 1200 for processing the disclosed architecture in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a machine that manages media content, the system comprising:
   a processor for executing instructions of a component, the component that:
      synchronizes with a handheld device, the handheld device being in continuous or intermittent communication with the component;
      automatically determines an amount of available storage space associated with a storage space of the handheld device;
      based at least in part on the amount of available storage space, moves a media presentation persisted on the storage space of the handheld device to a remote storage media, the remote storage media being remote from the handheld device, the component being further configured to:
         move frames excluding an initial set of frames affiliated with the media presentation from the handheld device to the remote storage media, the initial set of frames being persisted on the storage space of the handheld device to facilitate uninterrupted playback of the media presentation in response to a received request to playback the media presentation;
         cause the handheld device to maintain a link to the media presentation; and
         retrieve moved frames affiliated with the media presentation to facilitate continuous playback of the media presentation in response to a request from the handheld device to play back the media presentation; and
      determines a resolution or definition format of other media content for recording to the handheld device based in part on:
         the determined amount of available storage space associated with the handheld device;
         a communication network speed between the handheld device and the remote storage media;
         a storage rate of the remote storage media; and
         a retrieval rate of the remote storage media.

2. The system of claim 1, the component creates a sized cache on the storage space of the handheld device and stores the initial set of frames in the sized cache.

3. The system of claim 2, the sized cache dependent on a speed of communications between the component and the device.

4. The system of claim 3, the slower an assessed speed of communications the larger the sized cache.

5. The system of claim 1, the storage device remote from the handheld device being a storage device within a media farm.

6. The system of claim 5, the media farm includes storage media associated with a household appliance, a multimedia player, or a portable computer.

7. The system of claim 5, the media farm includes a microwave oven, a dishwasher, or a refrigerator.

8. The system of claim 1, the component ascertains a predictive likelihood that a user will view the media presentation.

9. The system of claim 8, the predictive likelihood based at least in part on prior utilization of the device by the user.

10. The system of claim 8, the predictive likelihood based at least in part on past viewing behavior associated with the user.

11. The system of claim 1, further comprising:
    a synthesizer that combines or filters information received from an input of the component.

12. The system of claim 1, further comprising:
    a context analyzer that determines context associated with the media presentation; and
    wherein information fragments of at least one of an input or a sensor utilizing different sensing modalities are analyzed to compensate for fragmentation of the media presentation.

13. A machine implemented method that manages media content, the method comprising:
    employing a component to determine storage utilization of a handheld device;
    based at least on the storage utilization, identifying media content for removal from storage associated with the handheld device;
    removing all frames but a dynamically ascertained number of initial frames, the frames relate to the media content;
    transferring the media content from the storage associated with the handheld device to a media storage farm associated with the component;
    utilizing the dynamically ascertained number of initial frames when a user requests transferred media content prior to retrieving the transferred media content from the media storage farm;

facilitating a user search for the transferred media content utilizing meta data associated with the transferred media content;
determining a resolution or definition format of the transferred media content to the handheld device based in part on:
the determined storage utilization of the handheld device;
a communication speed between the handheld device and the media storage farm;
a storage rate of the media storage farm; and
a retrieval rate of the media storage farm;
enforcing and controlling access to digital data through use of a smart card, a chip card, or integrated circuit technologies to permit or deny access to the media content;
facilitating continuous playback of the transferred media content after video playback of the dynamically ascertained number of initial frames;
analyzing information fragments of at least one of an input or a sensor utilizing different sensing modalities to facilitate a data fusion of the information fragments, the information fragments being associated with management of media content on the handheld device; and
fusing the information fragments based in part on the analyzing, the fusing including using independent components of the information fragments to fill out an information space, and using dependent components of the information fragments to improve a quality of the management of the media content.

14. The method of claim 13, the dynamically ascertained number of initial frames based on an assessed communication speed between the component and the handheld device.

15. The method of claim 13, the dynamically ascertained number of initial frames based on an assessed communication speed between the component and the media storage farm.

16. The method of claim 13, the identifying includes utilizing artificial intelligence, machine learning, or heuristics to predict a likelihood that a user will view the media presentation in a future period of time.

17. The method of claim 16, the likelihood is based in part on:
an assessed communication speed between the component and the handheld device;
prior utilization of the handheld device by a user; or
past viewing behavior associated with other users of the handheld device.

18. One or more computer-readable storage devices having stored thereon computer-executable instructions, the computer executable instructions configured to instruct a computer to perform operations comprising:
monitoring content and available storage space on a portable media playing device;
dynamically aging out and loading new content to the device as a function of user references, where a subset of the aged out content is left on the device, wherein the subset of the aged out content are a number of initial frames relating to the aged out content;
transferring the aged out content from the storage associated with the portable media playing device to a media storage farm remote from the portable media playing device, the media farm including one or more household appliances;
determining a resolution or definition format of content to be recorded on the portable media playing device based in part on:
the monitored available storage space on the portable media playing device;
a communication speed between the portable media playing device and the media storage farm; and
a retrieval rate of the media storage farm;
facilitating a user search for the transferred aged out content utilizing meta data associated with the transferred aged out content;
enforcing and controlling access to digital data, such control being effectuated through use of a smart card, a chip card, or integrated circuit technologies to a permit or deny access to the transferred aged out content;
utilizing the subset of the aged out content when a user requests transferred aged out content prior to retrieving the transferred aged out content from the media storage farm;
facilitating continuous playback of the transferred aged out content after video playback of the subset of the aged out content; and
effectuating hot swapping of the transferred aged out content back to the media storage farm remote from the portable media playing device based on a received user input.

* * * * *